United States Patent [19]

Bruinsma

[11] 4,394,775
[45] Jul. 19, 1983

[54] FREQUENCY DIVISION COMMUNICATION SYSTEM WHEREIN CONVENTIONAL TRANSMITTER-TRANSCEIVER CAN BE USED AS A REPEATER OR LOCAL BASE STATION

[75] Inventor: John Bruinsma, Clayton, Australia

[73] Assignee: U.S. Philips Corporation, New York, N.Y.

[21] Appl. No.: 266,575

[22] Filed: May 22, 1981

[30] Foreign Application Priority Data

May 29, 1980 [AU] Australia .............................. PE03784

[51] Int. Cl.³ .......................... H04B 7/14; H04B 1/44
[52] U.S. Cl. ...................................... 455/17; 455/79; 455/77
[58] Field of Search ........................ 455/11, 17, 77–79; 370/32

[56] References Cited

U.S. PATENT DOCUMENTS

3,854,093 12/1974 Schonegg .............................. 455/77
4,048,561 9/1977 Wilcox et al. ......................... 455/78

Primary Examiner—Jin F. Ng
Attorney, Agent, or Firm—Thomas A. Briody; William J. Streeter; Edward W. Goodman

[57] ABSTRACT

Frequency division communication system wherein conventional transmitter-transceiver can be used as or repeater or local base station. No additional transmitter and receiver are required to adapt transceiver to function as interchannel repeater.

5 Claims, 4 Drawing Figures

FREQUENCY DIVISION COMMUNICATION SYSTEM WHEREIN CONVENTIONAL TRANSMITTER-TRANSCEIVER CAN BE USED AS A REPEATER OR LOCAL BASE STATION

BACKGROUND OF THE INVENTION

The present invention relates to transceivers for use in a frequency division, two-frequency multichannel communication system having:

a multichannel transmitter, with transmission channel selection means for selecting a wanted transmitter frequency, and a multi-channel receiver, with receive channel selection means for selecting a wanted channel receiving frequency band.

In such transceivers, it is commonplace for the control system of the transmission channel selection means and that of the receive channel selection means to be ganged together so as to simultaneously select the respective transmitter frequency and receiving frequency band of the same two-frequency channel.

In a single frequency, frequency division, multi-channel cummunication system, a plurality of channels are each allocated a single frequency band, each band being centered on a chosen frequency, the channel center frequencies being spaced apart by a given frequency spacing, for example a frequency spacing of 25 kHz between center frequencies.

In a two-frequency communication system, each channel is alotted two frequency bands the center frequencies of which are relatively widely spaced apart, for example a frequency spacing of 5 mHz. In a two-frequency net system, a central station broadcasts to a number of remote stations each station having a transmitter and a receiver. The remote stations may be mobile or portable transceivers. The transmitter of the central station is set to radiate signals at a particular frequency (F1) and the receivers of the remote stations are all tuned to receive signals at the same frequency (F1), whereas the transmitters of the remote stations are set to radiate signals at a different frequency (F2) while the receiver of the central station is tuned to receive signals at that different frequency (F2). Thus, the central station can broadcast to all the remote stations and any one remote station can transmit a message to a central station.

If the receiver output of the central station is connected to the input of the central transmitter, then any signal radiated by a remote station is received by the central station and re-broadcast to all other remote stations. The central station of such a network is commonly referred to as a talk-through base station.

In a communication network employing a talk-through base station and several remote mobile or portable stations, it is a common practice to employ multi-channel transceivers in the remote stations. In such a system, a particular two-frequency channel for example having center frequencies F1 and F2 is reserved for communication between remote stations via the talk-through base station while the remaining two-frequency channels are available for communication between individual stations either inside or outside the network. The two-frequency channel system permits duplex communication between suitably equipped individual stations although only simplex communication is possible when communication takes place via the talk-through base station.

The power output of a mobile station is usually less than that of a base station and the power output of a portable station is usually less than that of a mobile station. To facilitate communications, it is sometimes desirable to provide a two-way interchannel relay station or repeater located within range of a talk-through base station via which a remote mobile or portable station with insufficient range to call the base station direct, is still able to communicate with the base station and hence with other remote stations of the network. Communication takes place between the relay station and the base station on a first two-frequency channel having, for example, the two center-frequencies F1 and F2 while communication between the relay station and the mobile or portable station takes place on a second two-frequency channel having, for example, the two center frequencies F3 and F4.

It will be appreciated that a relay station set to retransmit a signal having the same carrier frequency as that of the received signal could result in severe distortion of the repeated signal. Accordingly, an interchannel relay station is desirable.

Known interchannel relay stations are constituted by two transmitter/receiver combinations in which the receiver and transmitter of each combination is in a "back to back" relationship i.e. the output of the receiver of each combination being connected to the input of the transmitter of the same combination. For instance, assuming a first two-frequency channel having frequencies F1 and F2, at which frequencies a talk-through base station respectively transmits and receives and assuming a second two-frequency channel having frequencies F3 and F4, the receiver of one transmitter/receiver combination of the relay station would be tuned to receive the band center on frequency F1 and the transmitter of the same combination set to radiate at frequency F4 while the receiver of the other transmitter/receiver combination of the relay station is tuned to receive the band center on frequency F3 with the transmitter of its combination set to radiate at frequency F2. In this way, a remote station of insufficient range to communicate with the base station, but within range of the relay station is able to transmit on the frequency F3 and receive on the frequency F4. A message transmitted at the frequency F3 by the out-of-range remote station is received by the relay station and retransmitted by the relay station at the frequency F2. The message retransmitted by the relay station on the carrier frequency F2 is received by the base station and retransmitted by the base station at the carrier frequency F1 so as to be received by all other remote stations of the network. A replay transmitted from the remote station on a carrier frequency F2 is received by the base station and retransmitted on carrier frequency F1 which is received by the repeater, the repeater retransmitting the replay to the out-of-range remote station on the carrier frequency F4.

It is also known to provide an interchannel two-way relay station for repeating between a two-frequency channel and a single frequency channel. For example, with a two-frequency net system comprising a talk-through base station operating on a first channel having frequencies F1 and F2 and several remote stations, the system is sometimes extended so as to include, via an interchannel relay station, one or more stations, for instance portable transceivers, equipped to transmit and also receive on the single frequency F3 of a single-frequency second channel. In this case also, the interchannel relay station is constituted by two transmitter, receiver combination, the respective transmitters and receivers of which are in back-to-back relationship. The receiver of one combination is turned to the band centered on the frequency F1 and the transmitter of that combination is set to transmit at a frequency F3 whereas the receiver of the other combination is tuned to the band centered on a frequency $F_3$ whereas the transmitter of that combination is set to transmit at the frequency F2.

The desirability of modifying a conventional multi-channel mobile transceiver so as to be able to function as a two-way interchannel relay station when necessary is acknowledged by persons skilled in the art. However, such modification hitherto has required provision of an additional transmitter and an additional receiver together with other additional equipment such as diplexer units and aerial systems to achieve a satisfactory result.

SUMMARY OF THE INVENTION

An object of the present invention is to provide a transceiver for use in a frequency division, two-frequency communication system which may be employed as a two-way interchannel relay station, the transceiver comprising a single multi-channel transmitter and a single multichannel receiver. Another object of the present invention is to provide such a receiver which may alternatively be employed as a two-way common channel relay station i.e. as a "local talk-through base station".

A transceiver for use in a frequency division, two-frequency multichannel communication system having a multichannel transmitter with transmission channel selection means for selecting a wanted channel transmitter frequency and a multichannel receiver with receive channel selection means for selecting a wanted channel receiving frequency band, in accordance with the invention is characterized by an automatic control system comprising;

a multi-stable periodic switching device for switching the receive channel selection means so as to sequentially select a first channel receiving frequency band and a second channel receiving frequency band, detection means fed by signals received within the frequency band of a selected receive channel which, in response to detection thereby of a received signal having one or more predetermined characteristics, produces a keying signal which arrests periodic switching of the multi-stable switching device and excites the transmitter to transmit information carried by the received signal, the multi-stable switching device being coupled to the transmission channel selection means via a steering circuit so that the selected channel transmitter frequency is determined by the state occupied by the multi-stable switching device upon arrest, the steering circuit having one or more steering modes including a first steering mode in which the transmission channel selection means is switched to the second channel transmission frequency in response to a received signal within the first channel receiving frequency band and is alternatively switched to the first channel transmission frequency in response to a received signal within the second channel receiving frequency band.

A transceiver in accordance with the invention is thus able to function as a two-way interchannel relay station in a two-frequency net system having a talk-through base station transmitting and receiving in the said first channel at frequencies F1 and F2 respectively, and remote stations capable of transmitting and receiving in the said second channel at frequencies F3 and F4, respectively.

A transceiver in accordance with the invention having, in addition to the said automatic control system, a second control system for alternatively controlling inter-alia the said transmitter and receiver channel selection means so that the transceiver may be operated in a conventional manner, is advantageous. Such a transceiver is particularly useful, for example, when employed in a motor vehicle as a mobile station in a two-frequency net system and permits the operator to use the transceiver in a conventional manner by means of the second control system, to communicate via the talk-through base station by transmitting and receiving in the said first channel at frequencies F2 and F1, respectively. Alternatively, the operator is able to leave the mobile station set to operate with the said automatic control system and, at a distance from the mobile station, employ a short-range, auxiliary, manually portable transceiver equipped to transmit and receive in the said second channel at the frequencies F3 and F4 for communication in the two-frequency net system, gaining access to the said first channel via the mobile station in his vehicle.

A practice frequently adopted in a two-frequency net system is to equip the transmitter of each station with a modulator for automatically modulating each transmission with identification information and to provide the receiver of each station with recognition circuitry for identifying transmissions within the system so that signals not modulated with the particular identification information are not reproduced by the loud-speaker of station receivers as originating from outside the system. The idenfication information is not audible to an operator and may, for instance, be in the form of a constant subaudible tone having a frequency of 107 Hz.

In one form of the invention, the said detection means produces the said keying signal in response to detection of a carrier, regardless of whether the carrier is modulated or unmodulated.

In another form of the invention, the said automatic control system characterizing the transceiver additionally comprises idenfication information recognition means responsive to predetermined identification information carried by a received signal, which recognition means inhibit arrest of the said multistable device and/or excitation of the transmitter in the absence of such identification information.

In the situation previously referred to in which an operator employs a transceiver in accordance with the invention as a two-way interchannel relay station for relaying messaged transmitted by a short range auxiliary transceiver, it is evident that such an auxiliary transceiver must be provided with a modulator for the modulation of its transmission by the predetermined identification information in order that messages are relayed from the said second channel (F3 and F4) into the said first channel (F1 and F2).

In accordance with a further aspect of the present invention, the said steering circuit of the said automatic control system has, in additional to said first steering mode, a second steering mode in which the transmission channel selection means is switched to the first channel transmitter frequency in response to a received signal within the first wanted channel receiving band and is alternatively switched to the first channel transmitter frequency in response to a received signal within the second wanted channel receiving frequency band, the transceiver additionally comprising an identification information recognition means responsive to predetermined identification information carried by a received signal, the said steering circuit being controlled by the recognition means in such a manner that it operates in the first steering mode in response to a received signal carrying such predetermined identification information and operates in the second steering mode in response to a received signal without such predetermined identification information. Thus, with a transceiver in accordance with this further aspect of the invention operating as a relay station, provided each auxiliary transceiver incorporates an inhibition means for inhibiting modulation of its transmission by such identification information, the operators of two auxiliary transceivers are able to communicate with each other by transmission and reception in the second channel via the relay station by placing their respective switches in the inhibit position.

DESCRIPTION OF THE DRAWINGS

The invention will now be described with reference to the accompanying drawings in which.

DESCRIPTION OF THE PREFERRED EMBODIMENTS

Figure 1:
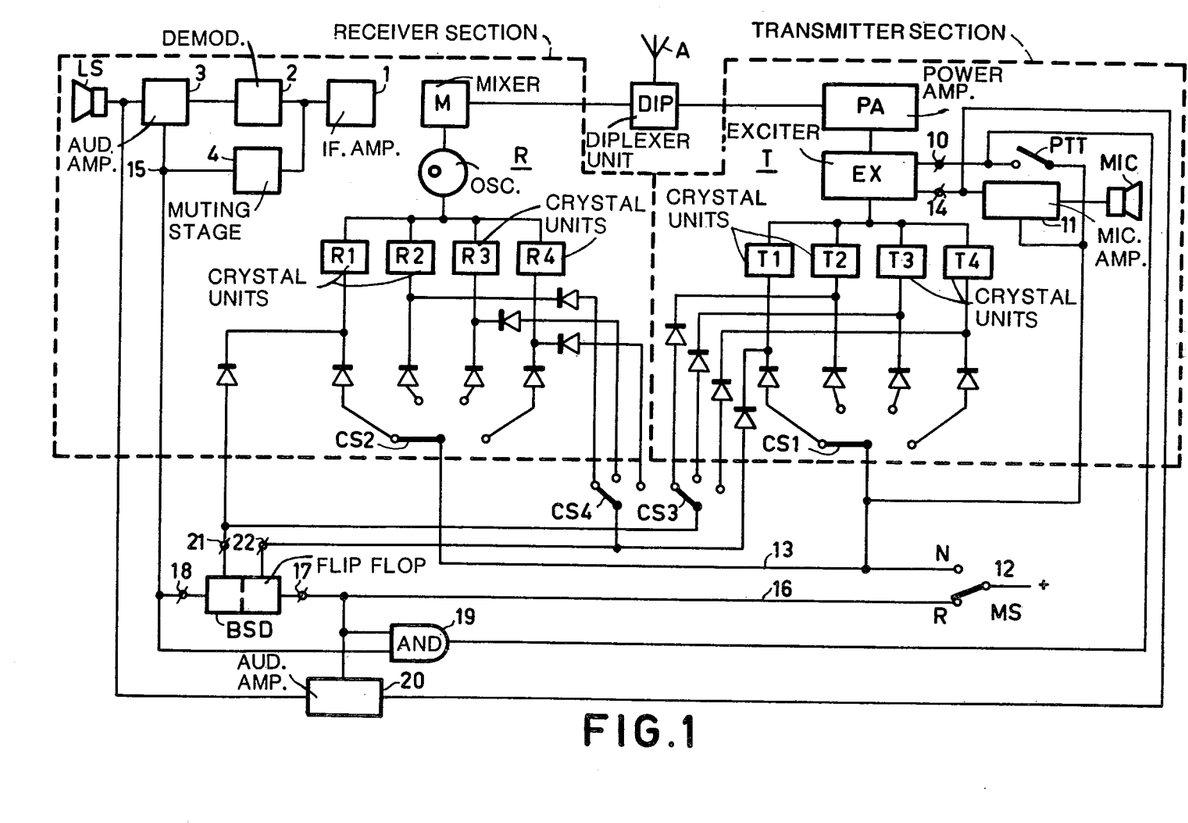
FIG. 1 is a schematic circuit diagram of a transceiver in accordance with the invention.

The transceiver of FIG. 1 comprises a transmitter section within the dotted line portion of the figure denoted generally by the letter T and a receiver section within the dotted line portion of the figure denoted generally by the letter R. The transmitter section T includes a power amplifier PA, an exciter unit EX, a transmission channel selection means associated with the exciter unit EX comprising four transmitter frequency control crystal units T1, T2, T3 and T4 and a microphone MIC feeding a microphone amplifier 11 for supplying microphone signals to the exciter unit EX.

The receiver section R includes a mixer stage M, a local oscillator O, a receive channel selection means associated with the local oscillator O and comprising four receive frequency control crystal units R1, R2, R3 and R4, an intermediate frequency amplifier stage 1, a demodulation stage 2, an audio frequency amplification stage 3 driving a loudspeaker LS and a muting stage 4.

The transceiver of FIG. 1 is provided with a two-position mode switch MS which may be switched to either the "normal" position N or to the "relay" position R as indicated in the figure. When the switch MS is in the "normal" position, the transceiver functions in a known manner as a conventional manually controlled two-frequency multichannel UHF transceiver. On the other hand, when the switch MS is in the "relay" position, the transceiver functions as an inter-channel relay.

The input of the mixer stage M and the output of the power amplifier PA are each connected through the diplexer unit DIP to a common aerial A by which transmission of outgoing signals and reception of incoming signals takes place.

The power amplifier PA, the exciter unit EX and the frequency control crystal units T1, T2, T3 and T4 are all of known kind and are interconnected in a known manner. The transmitter T transmits a signal only upon application of a positive potential to the control terminal 10 of the exciter unit EX whereupon the power amplifier PA is excited into operation by the exciter unit EX, the frequency of the transmitted signal being determined by the particular transmitter frequency control crystal unit that is operational during excitation. The switching arrangements of the transceiver are such that only one transmitter frequency control crystal unit is operational at a time. The exciter unit EX incorporates a modulator (not shown) whereby the transmitted signal is frequency modulated by audio frequency signals present at the audio input terminal 14 of the exciter unit EX.

Likewise, the mixer stage M, the local oscillator O, together with the frequency control crystal units R1, R2, R3 and R4, the intermediate frequency amplifier stage 1, the demodulator 2, the audio amplifier 3 and the muting stage 4 are all of known kind and are also interconnected in a known manner to function as a superheterodyne receiver for frequency modulated signals in the UHF region. Received signals are fed from the aerial A via the diplexer unit DIP to the mixer stage M where they are mixed with an oscillation supplied by the local oscillator O to produce a similarly modulated intermediate frequency signal, the oscillation supplied by the local oscillator having a frequency determined by the particular receive frequency control crystal unit that is operational at the time of reception. The switching arrangements of the transceiver are such that, likewise, only one receive frequency control crystal unit is operational at a time. The resultant modulated carrier at the intermediate frequency produced at the output of the mixer stage M is amplified by the intermediate frequency amplifier 1 and after demodulation in the demodulation stage 2, the resultant audio signal is supplied to the loudspeaker LS via the audio frequency amplifier stage 3. The muting stage 4 is sensitive to the presence of a carrier produced at the output of the intermediate frequency amplifier 1 regardless of whether or not the carrier is modulated and, in response to the presence of such a carrier, produces a "high" voltage at its output terminal 15. With no carrier present at the output of the intermediate amplifier stage 1, the terminal 15 is "low". The terminal 15 is connected to a control terminal of the audio frequency stage 3 so that, in a known manner, the audio frequency amplifier stage 3 amplifies audio signals fed to it by the demodulator 2 when the terminal 15 is "high", the amplifier 3 being cut-off when the terminal 15 is "low". As is well known the provision of a muting stage for controlling an audio frequency amplification stage eliminates an objectionable noise output from the loudspeaker when no signal is being received.

With the switch MS in the "normal" position, the positive supply line 12 is connected via the switch MS to the rail 13 to which the respective slider arms of the receive channel selector switch CS2 and the transmitter channel selector switch CS1 are connected. Each of the control crystal units R1, R2, R3 and R4 is connected via an isolation diode to a separate contact of the receive channel selector switch CS2 and similarly each of the control crystal units T1, T2, T3 and T4 is connected via an isolation diode to a separate contact of the transmitter channel selector switch CS1. The slider arm of the switch CS1 is ganged to the slider arm of the switch CS2 so that the control crystal units R1 and T1 are rendered operational simultaneously provided the switch MS is in the "normal" position. Likewise, the control crystal units R2 and T2, the control crystal units R3 and T3 and the control crystal units R4 and T4 can, respectively, be rendered operational simultaneously. The respective crystals incorporated in the control crystal units R1, R2, R3 and R4 have different resonant frequencies which respectively, determine the operating frequency of the local oscillator O. Likewise, the respective crystals incorporated in the control crystal units T1, T2, T3 and T4 has a different resonant frequency which respectively, determines the frequency of the carrier transmitted by the power amplifier PA. The frequencies of the control crystal units R1 and T1 respectively, coincide with the two frequencies allocated for channel 1 whereas the frequencies of the control crystal units R2 and T2 respectively, coincide with the two frequencies allocated for channel 2 and so on. Typical allocated frequencies for the channels 1 to 4 are as follows:

| Channel 1 | Channel 2 | Channel 3 | Channel 4 |
| --- | --- | --- | --- |
| 491.0 mhz (F3) | 490.9 mhz (F1) | 490.8 mhz | 490.7 mhz |
| 496.2 mhz (F4) | 496.1 mhz (F2) | 496.0 mhz | 495.9 mhz |

If a base station transmits at the lower and receives at the higher of the allocated channel frequencies in a two-frequency channel system, then the resonant frequencies of the control crystal units T1, T2, T3 and T4 are chosen so that the power amplifier PA transmits at the following frequencies for the respective channels listed below:

| Channel 1 | Channel 2 | Channel 3 | Channel 4 |
| --- | --- | --- | --- |
| 496.2 mhz (F4) | 496.1 mhz (F2) | 496.0 mhz | 495.9 mhz | whereas the resonant frequencies of the control crystal units R1, R2, R3 and R4 are chosen so that the operating frequency of the local oscillator O is appropriate for reception of frequency bands centered on the following frequencies for the channels 1 to 4 listed below:

| Channel 1 | Channel 2 | Channel 3 | Channel 4 |
| --- | --- | --- | --- |
| 491.0 mhz (F3) | 490.9 mhz (F1) | 490.8 mhz | 490.7 mhz |

The microphone amplifier 11 is so controlled by the potential of the line 13 that audio signals from the microphone MIC are fed to the terminal 14 only when the rail 13 is positive. In addition, when the rail 13 is positive, operation of the "press to talk" switch PTT will result in excitation of the power amplifier PA by application of a positive potential via the switch PTT to the control terminal 10. Accordingly, an operator is able to employ the transceiver of FIG. 1 as a conventional communication transceiver for transmitting and receiving messages on any one of the four two-frequency channels referred to above.

For convenience in the present description, it is assumed that the communications transceiver of FIG. 1 is employed in a motor vehicle as a mobile station forming part of a two-frequency net system together with other similar communication transceivers and a talk-through base station all operating on channel 2 and thus with the transmitter and receiver of the base station respectively, radiating at a frequency F1 (490.9 mhz) and receiving at a frequency F2 (496.1 mhz). Since each of the mobile stations is formed by a communication transceiver similar to the transceiver of FIG. 1 then any mobile station with its switch MS in the "normal" position and set to operate on channel 2 will transmit on frequency F2 and receive on the frequency F1. The operators of the mobile stations are then able to communicate on channel 2 via the talk-through base station. By operation of the ganged switches CS1 and CS2, any of the mobile stations are also able to communicate in any of the other chanels when the switch MS is in the "normal" position.

With such a system, it is a common practice for each vehicle to be provided with one or more manually portable or auxiliary transceivers, either of a multi-channel variety or of a kind permanently set to transmit and receive on a single channel. By means of such a portable transceiver set to operate on channel 2, the operator is able to absent himself from this vehicle and still communicate with other mobile stations via the talk-through base station provided his portable transceiver has adequate range for doing so. However, for the reasons of economy and portability, the transmitters of such portable transceivers are usually much less powerful than transceivers fitted to motor vehicles. Such considerations limit communication generally and the use of portable transceivers when an operator is absent from his vehicle and it has become the practice to allocate a particular channel for use with the portable transceivers, the particular allocated channel being a different channel to that of the communication net. By following this practice, the operator of a portable transceiver within range of an inter-channel relay is still able to communicate with the base station and hence with other mobile stations. For convenience in the present description, it is further assumed that channel 1 is allocated for use by such portable transceivers, the portable transceivers being set to transmit signals on a frequency F3 (491.0 mhz) and to receive signals on a frequency F4 (496.2 mhz).

In accordance with the invention, the transceiver of FIG. 1 functions as an interchannel relay when the switch MS is in the "relay" position. Changeover of the switch MS to the "relay" position disconnects the supply line 12 from the rail 13 which is then no longer at a positive potential so that the microphone amplifier 11 is no longer operative, the power amplifier PA can no longer be excited by operation of the switch PTT and the control crystal units R1, R2, R3, R4, T1, T2, T3 and T4 can no longer be rendered operative by application of a positive potential via the selector switches CS1 and CS2. However, change-over of the switch MS to the "relay" position connects the positive supply line 12 to the rail 16, the latter being connected to the on/off control terminal 17 of a bistable switching device BSD, to one of the inputs of an AND gate 19 and to the control input of an audio amplifier 20. The other input of the AND gate 19 is connected to the terminal 15 so that provided the switch MS is in the "relay" position, the output of the AND gate 19 goes "high" each time the terminal 15 is "high" causing excitation of the power amplifier PA. The amplifier 20 is cut-off when the rail 16 is "low" and is operative when the rail 16 is "high", and since the output of the audio amplifier 3 is connected to the audio input terminal 14 of the exciter unit EX via the amplifier 20, signals transmitted by the power amplifier PA are modulated by any audio signal present at the output of the amplifier 3 provided the switch MS is in the "relay" position.

The bistable switching device BSD is in the form of a balanced flip-flop of known kind having, in addition to its on/off control terminal 17, an arrest control terminal 18 and two output terminals 21 and 22. Provided the arrest terminal 18 is "low" and the on/off terminal 17 is "high", the switching device BSD is a free-running device both output terminals of which are alternately rendered "high" and "low" for equivalent periods of time, the output terminal 21 being "high" when the output terminal 22 is "low" and vice-versa. The operating frequency of the switching device BSD is approximately 5 Hz. When the arrest control terminal 18 becomes "high", the operation of the bistable device BSD is immediately arrested, the output 21 or 22 which is "high" at the instant of arrest remaining "high" with the other output remaining "low" until such time as the arrest terminal 18 becomes "low" once more whereupon the device BSD becomes a free-running device once more. Since the arrest control terminal 18 of the switch BSD is directly connected to the terminal 15, the device BSD is arrested each time the terminal 15 is "high" and runs freely each time the terminal 15 is "low".

The output terminal 21 of the bistable switching device BSD is connected via an isolating diode to the control crystal unit R1 and also to the slider arm of the relay transmission channel selector switch CS3, the three contacts of which are respectively connected via isolating diodes to the control crystal units T2, T3 and T4 whereas the output terminal 22 of the bistable switching device BSD is connected via an isolating diode to the control crystal unit T1 and also to the slider arm of the relay receive channel selector switch CS4, the three contacts of which are respectively connected via isolation diodes to the control crystal units R2, R3 and R4. The slider arm of the switch CS3 is ganged to the slider arm of the switch CS4 so that the control crystal units R2 and T2 are connected in circuit simultaneously. Likewise, the control crystal units R3 and T3 or the control crystal units R4 and T4 can respectively, be connected in circuit simultaneously.

With the bistable switching device BSD freely running, and with the slider arms of the ganged switches CS3 and CS4 in the positions indicated in FIG. 1, the crystal units R1 and T2 are rendered operational simultaneously each time the output 21 is "high" and non-operational each time the output 21 is "low" whereas the crystal units R2 and T1 are rendered operational simultaneously each time the output 22 is "high" and non-operational each time the output 22 is "low". As the period of the bistable switching BSD is approximately one-fifth of a second, the control crystal units R1 and T2 become operational for approximately one-tenth of a second five times each second while the control crystal units R2 and T1 are simultaneously non-operational and the crystal units R2 and T1 also become operational for one-tenth of a second five times per second while the crystal units R1 and T2 are simultaneously non-operational. Accordingly, with the switch MS in the "relay" position, with the ganged switches CS3 and CS4 set to the positions indicated in FIG. 1 and with the transceiver of FIG. 1 operational so that the switching BSD is freely running the receive frequency control crystal units R1 and R2 are rendered operative alternately and the receiver section R is able to receive signals alternately on channel 1 and channel 2. Under these conditions, if no signal is being received on either of the channels, the switching device BSD continues to freely run with channels 1 and 2 being scanned alternately. Reception of a signal on either channel 1 or channel 2 (F1 or F3) is detected by the muting stage 4 causing terminal 15 to become "high" thereby causing the bistable device BSD to be immediately arrested so that the receive frequency control crystal unit operational at the instant of reception remains operational. When the terminal 15 becomes "high", since the gate 19 is enabled and the amplifier 20 is operational owing to the positive potential present on rail 16, the control terminal 10 of the exciter units EX also becomes "high" thereby exciting the power amplifier PA to re-transmit on the opposite channel the demodulated received signal present at the output of the amplifier 3. In other words, reception of a signal on channel 1 at the frequency F3 when the receive frequency control crystal unit R1 is operational owing to the output 21 being "high" at that instant, results in arrest of the bistable device BSD and retransmission on channel 2 at the frequency F2 since the transmit frequency control crystal unit T2 is simultaneously operational. Likewise, reception of a signal on channel 2 at the frequency F1 when the receive frequency control crystal unit R2 is operational owing to the output 22 being "high" at that instant results in arrest of the bistable device BSD and re-transmission on channel 1 at the frequency F4 since the transmit frequency control crystal unit T1 is simultaneously operational.

An operator provided with a communication transceiver of the kind described in relation to FIG. 1 fitted to his vehicle for use as a mobile station, is able to absent himself from the vehicle leaving the switch MS in the "relay" position and the ganged switches CS3 and CS4 in the positions indicated in the figure so that the mobile station functions as an inter-channel relay between channels 1 and 2. By using a portable transceiver set to transmit on frequency F3 and to receive on the frequency F4, the operator is able to communicate with other mobile stations of the two-frequency communication net while he is away from the vehicle.

In the transceiver of FIG. 1, the bistable switching device BSD in association with the muting stage 4 function as an automatic control system when the switch MS is in the "relay" position. The connections between the outputs 21 and 22 of the bistable switching device BSD and the respective control crystal units R1, R2, T1 and T2 provides a steering circuit which determines the transmission frequency of the power amplifier PA in accordance with the state occupied by the switching device BSD. For each position of the ganged switches CS3 and CS4, the steering circuit so provided has only one mode of operation. It will be appreciated that the ganged switches CS3 and CS4 are able to be adjusted so that with the switch MS in the "relay" position, the transceiver functions as an interchannel relay between channel 3 and channel 1 or between channel 4 and channel 1.

As previously mentioned, a practice sometimes adopted in a two-frequency net system requires the carrier signals radiated by every station of the communications net to be modulated by predetermined identification information and for the receivers of every station to be equipped with an identification information recognition means responsive to such predetermined identification information for inhibiting at least the audio stages of the station receiver, such inhibition being lifted only in response to reception of a carrier modulated by the predetermined identification information.

Figure 2:
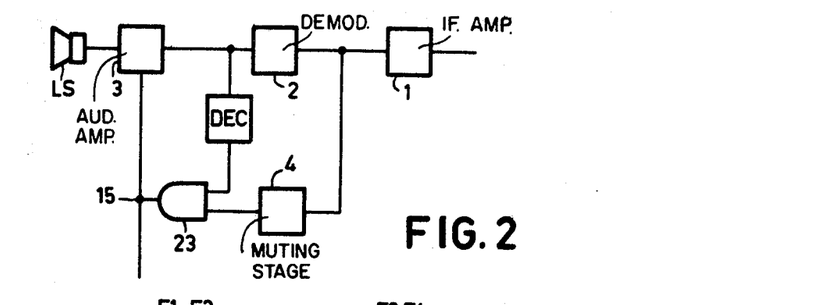
FIG. 2 is a schematic circuit diagram of a modified portion of the transceiver of FIG. 1.

The present invention in accordance with its broadest aspect may be put to use in a system in which identification information is not radiated by the stations of the system and the transceiver of FIG. 1, as described so far, is intended to operate regardless of whether or not received signals are modulated by identification information. However, the transceiver of FIG. 1 may readily be modified to function as a station in a communication net system where transmissions are all modulated by predetermined identification information. By known methods, the modulator, (not shown) incorporated in the exciter stage EX, may be modified so that each time the power amplifier PA is excited the transmitted signal is frequency-modulated by the predetermined identification information which may be, for instance, a continuous sub-audible tone having a frequency of 107 Hz. The receiver section R of the transceiver of FIG. 1 may also be modified to respond only to received signals originating from within the communication net. FIG. 2 is a schematic diagram of portion of the transceiver of FIG. 1 so modified.

In FIG. 2, parts corresponding with those of FIG. 1 are denoted by similar letters or numerals. In FIG. 2, the output of the muting stage 4 is connected to a two-input "AND" gate 23, the output of which is connected to the terminal 15. The output of the demodulator 2 feeds demodulated received signals to a decoder DEC, the output of which is connected to the other input of the "AND" gate 23. The decoder DEC is of known kind, appropriate to the characteristics of the predetermined identification signals employed in the system concerned, being such that the output of the decoder DEC becomes "high" in response to a demodulated signal being present at the output of the demodulator 2 having the characteristics of the predetermined identification signal, the output of the decoder DEC otherwise being "low". With the circuit arrangement of FIG. 2, the terminal 15 becomes "high" only when a carrier modulated by the predetermined identification signal, in this instance a sub-audible tone having a frequency of 107 Hz, is received. It follows that with the transceiver of FIG. 1 modified in accordance with FIG. 2 and with the switch MS in the "normal" position, the amplifier 3 remains muted unless a signal originating from within the net is being received. Likewise, with the switch MS in the "relay" position, reception of a signal that is not modulated by the predetermined identification signal will not cause arrest of the bistable switching device BSD or excitation of the power amplifier PA and the transceiver therefore does not function as an interchannel relay for such a signal.

Figure 3:
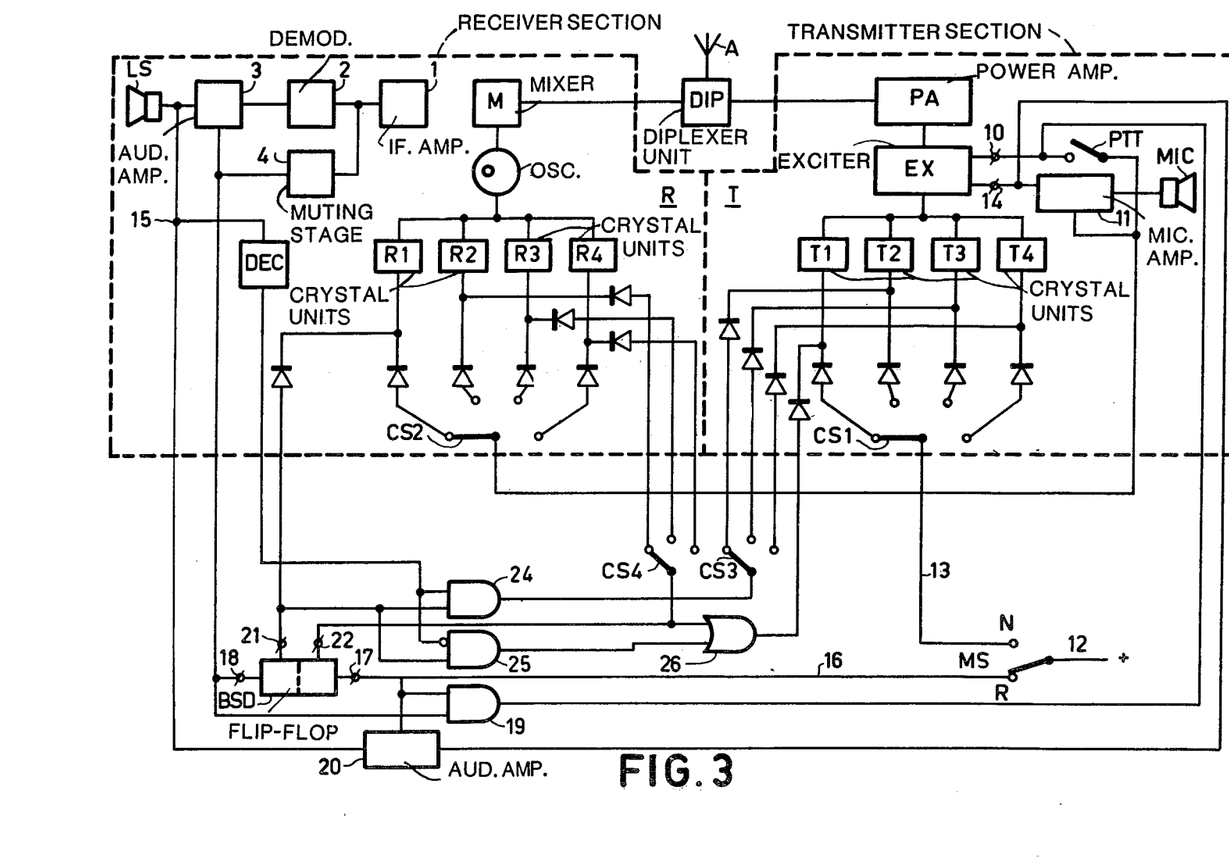
FIG. 3 is a schematic circuit diagram of another transceiver in accordance with the invention.

The transceiver of FIG. 3 is suitable for use as a mobile station in a two-frequency communication net employing other similar mobile stations and a talk-through base station and has additional features in accordance with the said further aspect of the present invention. The transceiver of FIG. 3 is basically similar to that of FIG. 1 except that a decoder stage DEC is provided which is responsive to reception of carrier signals modulated by an identification signal having predetermined characteristics and, in addition, the steering circuit interconnecting the outputs 21 and 122 of the bistable switching device BSD to the control crystal unit T1 and to the slider arm of the switch CS3 has two different steering modes. In the first steering mode, provided the ganged switches CS3 and CS4 are set to the positions indicated in the figure, the transmission channel selection means constituted by the crystal units T1 and T2, are switched so that the power amplifier PA retransmits on channel 1 in response to a received signal on channel 2 and retransmits on channel 2 in response to a received signal on channel 1. In the second steering mode, provided the ganged switches CS3 and CS4 are set to the positions indicated in the figure, the channel selection means constituted by the crystal units T1 and T2 are switched so that the power amplifier PA retransmits on channel 1 in response to a received signal on channel 1 and retransmits on channel 1 in response to a received signal on channel 2. The particular mode of operation of the steering circuit is controlled by the decoder DEC in association with two "AND" gates 24 and 25 and an "OR" gate 26 and is determined by whether or not the decoder DEC recognizes the received carrier signal as being modulated by identification information having the predetermined characteristics.

In response to received identification information having the predetermined characteristic, the output of the decoder DEC becomes "high", its output being "low" otherwise. The output of the decoder DEC is connected to an input of each of the "AND" gates 24 and 25, it being noted that inversion occurs at that input of the gate 25 to which the output of the decoder DEC is connected. Thus, the gate 24 is enabled and the gate 25 is disabled when the output of the decoder DEC is "high". On the other hand the gate 24 is disabled and the gate 25 is enabled when the output of the decoder DEC is "low". The other input of the gate 24 and that of the gate 25 are both connected to the output terminal 21 of the bistable switching device BSD. The output of the gate 24 is connected to the slider arm of the switch CS3 whereas the output of the gate 25 is connected to one input of the "OR" gate 26, the other input of which is connected to the output terminal 22 of the bistable switching device BSD. The output of the "OR" gate 26 is connected via an isolating diode to the transmitter frequency control crystal unit T1.

The decoder DEC may take any one of variety of known forms depending upon the nature of the identification information adopted in the system concerned. The adopted identification information may, for instance, comprise a single continuous sub-audible tone having a frequency of 107 Hz. On the other hand, the adopted identification information may comprise several tone signals each having a different frequency and modulated either simultaneously or in a particular sequence. Other kinds of identification information such as a signal that is encoded in a particular manner by the use of pulse coding techniques are known to persons skilled in the art and may be employed in the system concerned.

If the adopted identification information is a continuous sub-audible tone signal having a frequency of 107 Hz, the decoder DEC may comprise an amplifier tuned to accept a narrow frequency band centered on 107 Hz and feeding a simple rectifier circuit having a load impedance across which a positive voltage is developed by the rectification of an accepted signal. However, the precise form of the decoder DEC is not an essential part of the present invention.

With the communications transceiver of FIG. 3 in operation having the switch MS in the "relay" position and the ganged switches CS3 and CS4 in the positions indicated in the figure so that the bistable switching device BSD is freely running and the control crystal units R1 and R2 are rendered operative alternately whereby the receiver section R is able to receive signals alternately on the frequency F3 of channel 1 and on the frequency F1 of channel 2, upon reception of a signal having a frequency of either F1 or F2, regardless of whether or not the received signal is modulated by the predetermined identification information, the switching device BSD is instantly arrested so that the receiver section R is "locked on" to the frequency of the received signal, the power amplifier PA being excited simultaneously via the gate 19 and the terminal 10 and the output of the amplifier 3 being applied to the terminal 14 via the amplifier 20. However, if the received signal is modulated by the predetermined identification information, the steering circuit is caused to operate in the first steering mode whereas if the received signal is not modulated by the predetermined identification information, the steering circuit is caused to operate in the second mode. Thus, there are four different possibilities to be considered. Reception of a signal having either the frequency F1 or the frequency F3 either of which may or may not be modulated by the predetermined identification information.

Firstly, in the case of received signals having the frequency F1 of channel 2, if the output of the decoder DEC becomes "high" signifying reception of a signal modulated by the predetermined identification information, the steering circuit is in the first steering mode with the gate 24 enabled and the gate 25 disabled. As the bistable switching device BSD is arrested with the output 22 "high" and the output 21 "low", the control crystal unit T1 is rendered operative by the output 22, via the "OR" gate 26 and audio signals produced at the output of the amplifier 3 are retransmitted by the power amplifier PA at the frequency F4 of channel 1. Secondly, again in the case of received signals having the frequency F1 of channel 2, if the output of the decoder DEC becomes "low" signifying reception of a signal not modulated by the predetermined identification information, the steering circuit operates in the second mode with the gate 24 disabled and the gate 25 enabled. As the bistable switching device BSD is arrested with the output 22 "high" and the output 21 "low", the crystal unit T1 is rendered operative by the output 22 via the "OR" gate 26 and audio signals produced at the output of the amplifier 3 are retransmitted at the frequency F4 of channel 1. Thirdly, in the case of a received signal having the frequency F3 of channel 1, if the output of the decoder DEC becomes "high" signifying reception of a signal modulated by the predetermined identification information, the steering circuit operates in its first steering mode with the gate 24 enabled and the gate 25 disabled. The bistable device BSD is arrested with the output 21 "high" and the output 22 "low" so that the control crystal unit T2 is rendered operative via the gate 24 and the switch CS3 and audio signals at the output of the amplifier 3 are retransmitted by the power amplifier PA at the frequency F2 of channel 2. Fourthly, in the case of a received signal having the frequency F3 of channel 1, if the output of the decoder DEC becomes "low" signifying reception of a signal not modulated by the predetermined identification information, the steering circuit operates in the second mode with the gate 24 disabled and the gate 25 enabled with the bistable switching device BSD arrested with the output 21 "high" and the output 22 "low" so that the control crystal unit T1 is rendered operative via the gate 25 and the "OR" gate 26 and the audio signals at the output of the amplifier 3 are retransmitted by the power amplifier PA at the frequency F4 of the same channel, channel 1.

The communications transceiver of FIG. 3 as described is suitable for use in a motor vehicle employed as a mobile station forming part of a two-frequency net system together with similar communications transceivers and a talk-through base station all operating on channel 2. Any mobile station with its switch MS in the "normal" position and set to operate on channel 2 will transmit on the frequency F2 and receive on the frequency F1 so that the operators of the mobile stations are able to communicate on channel 2 via the talk-through base station.

The transceiver of FIG. 3 is particularly intended for use in association with auxiliary portable transceivers of a kind provided with a modulator which modulates transmission with identification information to which the decoder DEC of the transceiver of FIG. 3 is responsive and which is also equipped with an inhibit means for use by an operator to manually inhibit such modulation. An operator is able to absent himself from the vehicle leaving the switch MS in the "relay" position and the ganged switches CS3 and CS4 in the positions indicated in the figure and by employing such a portable transceiver which is set to transmit on the frequency F3 and to receive on the frequency F4, the operator is able to transmit messages at the frequency F3 which are either unmodulated or modulated by the predetermined identification information depending upon his use or otherwise of the inhibit means.

In response to transmission from such a portable transceiver, the communications transceiver of FIG. 3 with the switch MS in the "relay" position functions as an interchannel relay between channel 1 and channel 2 provided signals transmitted by the portable transceiver at the frequency F3 are modulated by the predetermined identification information but functions as a local talk-through base station on channel 1 if the signals transmitted by the portable transceiver at the frequency F3 are not so modulated. Operators of such portable transceivers are thus able to communicate with each other on channel 1 via the transceiver of FIG. 3 by simply operating the inhibit means without their transmissions being retransmitted on channel 2 and while still monitoring any transmission from the base station on channel 2. Alternatively, operators of such portable transceivers are able to communicate with mobile stations of the net via the transceiver of FIG. 3 by not operating the inhibit switch of their portable receiver.

Figure 4:
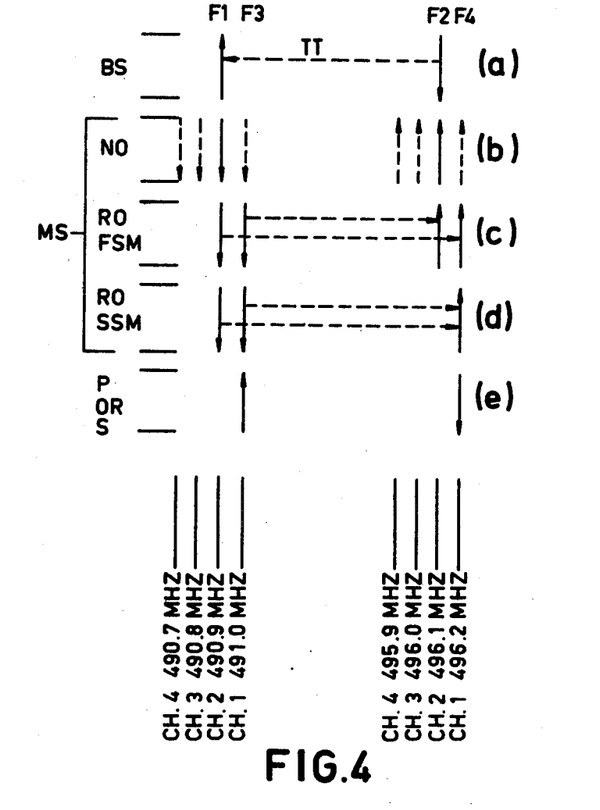
FIG. 4 is a frequency allocation diagram related to the operation of the transceiver described in relation to FIGS. 1, 2 and 3.

The relationship between the channel frequencies employed by the communications transceivers of FIG. 1 and FIG. 3 described herein and those of the base station and auxiliary or portable transceivers described herein are illustrated in FIG. 4.

In FIG. 4, an upwardly pointing arrow signifies transmission at a particular frequency whereas a downwardly pointing arrow signifies reception at a particular frequency.

FIG. 4(a) shows the frequency of transmission F1 and the frequency of reception F2 for a district talkthrough base station operating on channel 2.

FIG. 4(b) shows the frequency of transmission F2 and the frequency of reception F1 of the transceiver of either FIG. 1 or FIG. 3 functioning as a mobile station operating on channel 2 with the switch MS in the "normal" position.

FIG. 4(c) shows the frequencies of transmission F2 and F4 and the frequencies of reception F1 and F3 of the transceiver of FIG. 1 function as a mobile station with the switch MS in the "relay" position and the ganged switches CS3 and CS4 set to the position indicated in FIG. 1. The horizontal dotted lines with arrow heads indicate the frequency of re-transmission in response to reception of a signal at a particular frequency. The steering circuit of the transceiver of FIG. 1 has, of course, only one steering mode. The operation of the transceiver of FIG. 3 corresponds with that of the transceiver of FIG. 1 under similar conditions when the steering circuit of the latter is in the first steering mode. FIG. 4(d) shows the frequencies of transmission F2 and F4 and the frequencies of reception F1 and F3 of the transceiver of FIG. 3 functioning as a mobile station with the switch MS in the "relay" position and the ganged switches CS3 and CS4 set to the positions indicated in FIG. 3 when the steering circuit is in the second mode. The horizontal dotted lines with arrow heads again indicate the frequency of re-transmission in response to reception of a signal at a particular frequency.

FIG. 4(e) shows the frequency of transmission F3 and the frequency of reception F4 of an auxiliary or portable transceiver used in association with a transceiver of the kind described in relation to FIG. 1 or FIG. 3.

The embodiments of the present invention described in relation to FIGS. 1, 2 and 3 employ a bi-stable periodic switching device BSD for switching the receive channel selection means constituted by the control crystal units R1, R2, R3 and R4 to alternately select a first channel channel receiving frequency band and a second channel receiving frequency band. However, the invention is not restricted to the use of a bistable switching device. The automatic control system characterizing the present invention may, if desired, employ a switching device having more than two stable states. By way of example, a switching device may be employed in lieu of the bistable device BSD comprising a source of clock pulses driving a three-stage shift register to form a three-state periodic switching device having three output terminals only one of which is "high" at any given time, a "high" voltage being reduced sequentially at the three output terminals as the shift register is advanced under control of the clock pulses and with two of the output terminals connected in the manner depicted for the output terminals 21 and 22 of the bistable device BSD. The third terminal of such a three-stage periodic switching device may, for instance, be utilized to periodically render operative one of the other control crystal units and simultaneously render the exciter unit EX inoperative and energise an alarm system if the periodic switching device is arrested with the third terminal "high". Such an arrangement could be employed, for instance, for monitoring a particular channel allocated for the sole use of distress calls. Other uses of a multistate periodic switching in lieu of the bistable switching device BSD will be evident to persons skilled in the art.

What we claim is:

1. A transceiver for use in a frequency division, two-frequency multi-channel communication system having a multi-channel transmitter with transmission channel selection means for selecting a channel transmitter frequency and a multi-channel receiver with receive channel selection means for selecting a channel receiving frequency band, characterized in that said receiver further comprises an automatic control system coupled to said transmission channel selection means and said receive channel selection means, said automatic control system comprising:

a multi-stable periodic switching device for switching the receive channel selection means so as to sequentially select a first channel receiving frequency band and a second channel receiving frequency band, and for switching the transmission channel selection means so as to select a first channel transmitter frequency and a second channel transmitter frequency, said multi-stable periodic switching device having a control input which, in response to a keying signal, arrests the periodic switching therof;

detection means fed by signals received within the frequenccy band of a selected receive channel which, in response to detection thereby of a received signal having predetermined characteristics, applies said keying signal to the control input of said multi-stable periodic switching device and causes said transmitter to transmit information carried by the received signal; and a steering circuit, coupled between said multi-stable periodic switching device and said transmission channel selection means, having steering modes for determining which channel transmitter frequency is to be selected, in which a first steering mode causes said transmission channel selection means to select said second channel transmitter frequency in response to a received signal within said first channel receiving frequency band and, alternately, to select said first channel transmitter frequency in response to a received signal within said second channel receiving frequency band.

2. A transceiver as claimed in claim 1 wherein the said detection means produces said keying signal in response to detection of a carrier, modulated or unmodulated.

3. A transceiver as claimed in claim 1 which further comprising an identification information recognition means responsive to predetermined identification information carried by a received signal, which recognition means inhibits the arrest of said multi-stable periodic switching device and the excitation of the transmitter in the absence of such identification information.

4. A transceiver as claimed in claim 1 wherein said steering circuit has in addition to said first steering mode, a second steering mode in which said transmission channel selection means is switched to said first channel transmitter frequency in response to a received signal within said first channel receiving frequency band and is alternatively switched to said first channel transmitter frequency in response to a received signal within said second channel receiving frequency band, the transceiver additionally comprising an identification information recognition means responsive to predetermined identification information carried by a received signal, said steering circuit being controlled by said recognition means in such a manner that it operates in the first steering mode in response to a received signal carrying such predetermined identification information and in the second steering mode in response to a received signal without such predetermined identification information.

5. A transceiver as claimed in claim 1, 2, 3 or 4 which further comprises:

a further control system including manually operable channel selection switches for manually selecting a channel transmitter frequency and a channel receiving frequency band; and a transceiver mode selection switch for rendering said automatic control system inoperative while said further control system is operative and vice-versa.

* * * * *